US012631795B2

(12) United States Patent
Maury

(10) Patent No.: US 12,631,795 B2
(45) Date of Patent: May 19, 2026

(54) OPTICAL ARTICLE TO PROVIDE VISION CORRECTION FOR DEVICES USING EYE TRACKING DEVICE

(71) Applicant: Essilor International, Charenton-le-pont (FR)

(72) Inventor: Hélène Maury, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 391 days.

(21) Appl. No.: 18/031,409

(22) PCT Filed: Oct. 26, 2021

(86) PCT No.: PCT/EP2021/079682
§ 371 (c)(1),
(2) Date: Apr. 12, 2023

(87) PCT Pub. No.: WO2022/090228
PCT Pub. Date: May 5, 2022

(65) Prior Publication Data
US 2023/0375754 A1     Nov. 23, 2023

(30) Foreign Application Priority Data

Oct. 27, 2020    (EP) .................................... 20306282

(51) Int. Cl.
*G02B 1/116*          (2015.01)
*G02B 1/115*          (2015.01)
(Continued)

(52) U.S. Cl.
CPC .............. *G02B 1/116* (2013.01); *G02B 1/115* (2013.01); *G02B 5/282* (2013.01); *G02B 27/0093* (2013.01)

(58) Field of Classification Search
CPC ........ G02B 5/0816–0875; G02B 5/208; G02B 5/281–283; G02B 5/285–289; G02B 27/01–2027/0198
(Continued)

(56) References Cited

U.S. PATENT DOCUMENTS 4,211,823 A    7/1980  Suzuki et al.
5,015,523 A    5/1991  Kawashima et al.
(Continued)

FOREIGN PATENT DOCUMENTS

CN         110646950        1/2020
EP          0753762         1/1997
(Continued)

OTHER PUBLICATIONS

International Search Report issued in PCT Application No. PCT/EP2021/079682, dated Apr. 22, 2022.

*Primary Examiner* — Jessica M Merlin
(74) *Attorney, Agent, or Firm* — Norton Rose Fulbright US LLP

(57)          ABSTRACT
The invention relates to an optical article comprising a transparent substrate with a front main face and with a rear main face, at least one of the main faces being coated with a multilayered interferential coating comprising a stack of at least one high refractive index layer (HI) having a refractive index higher than or equal to 1.55 and at least one low refractive index layer (LI) having a refractive index layer lower than 1.55, wherein said multilayered interferential coating has: ■ mean light reflection factor in the visible region, noted R v, that is lower than or equal to 2.5% for at least an angle of incidence lower than or equal to 35°; ■ a mean reflection factor for wavelengths ranging from 800 nm to 900 nm, noted R $\mathrm{m}^{ET}$ (800ˉ900), that is lower than or equal to 1.5% at an angle of incidence lower than or equal to 20°, characterized in that: • ■ said multilayered interfer-
(Continued)

ential coating has a mean reflection in the near infrared (NIR) region ranging from 900 nm to 2000 nm, noted $R_m^{NIR}$, that is higher than or equal to 11.5% at an angle of incidence lower than or equal to 20° and/or said transparent substrate comprises at least one absorbing dye which absorbs in the near infrared region at a wavelength ranging from 900 to 2000 nm.

19 Claims, 3 Drawing Sheets

(51) Int. Cl.
  *G02B 5/28*  (2006.01)
  *G02B 27/00*  (2006.01)
(58) Field of Classification Search
  USPC ........ 359/13, 14, 359–360, 580–590; 349/11
  See application file for complete search history.

(56)       References Cited

U.S. PATENT DOCUMENTS

| | | | |
|---|---|---|---|
| 2005/0201422 A1 | 9/2005 | Ohta et al. | |
| 2013/0201562 A1 | 8/2013 | Kawagishi et al. | |
| 2014/0322502 A1* | 10/2014 | Koyama | G02B 1/11 |
| | | | 428/212 |
| 2017/0003520 A1* | 1/2017 | Iwasaki | G02B 27/0018 |
| 2017/0227681 A1 | 8/2017 | Maury et al. | |
| 2018/0003961 A1 | 1/2018 | Tremblay et al. | |

| | | | |
|---|---|---|---|
| 2018/0067338 A1* | 3/2018 | Höfener | G02B 1/113 |
| 2018/0113508 A1 | 4/2018 | Berkner-Cieslicki et al. | |
| 2019/0235236 A1* | 8/2019 | Ollila | G02B 27/0172 |

FOREIGN PATENT DOCUMENTS

| | | | | |
|---|---|---|---|---|
| EP | 1291331 | 3/2003 | | |
| EP | 1972966 | 9/2008 | | |
| EP | 2128658 | 12/2009 | | |
| EP | 2628818 | 8/2013 | | |
| EP | 3196677 | 7/2017 | | |
| EP | 3327488 | 5/2018 | | |
| EP | 3715920 | 9/2020 | | |
| FR | 2702486 | 9/1994 | | |
| FR | 2858816 | 2/2005 | | |
| FR | 2895522 | 6/2007 | | |
| JP | S6032001 | 2/1985 | | |
| JP | H1096801 | 4/1998 | | |
| JP | 2000111702 | 4/2000 | | |
| JP | 2003248103 | 9/2003 | | |
| JP | 2005338366 | 12/2005 | | |
| JP | 2005266780 | 6/2006 | | |
| JP | 2009521001 | 5/2009 | | |
| JP | 2009122416 | 6/2009 | | |
| JP | 2019032371 | 2/2019 | | |
| WO | WO 2005/060651 | 7/2005 | | |
| WO | WO 2011/080472 | 7/2011 | | |
| WO | WO 2017125999 | 7/2017 | | |
| WO | WO 2019/151344 | 8/2019 | | |
| WO | WO-2019151344 A1 * | 8/2019 | | G02B 5/26 |
| WO | WO 2020/058186 | 3/2020 | | |
| WO | WO2020/193473 | 10/2020 | | |

* cited by examiner

OPTICAL ARTICLE TO PROVIDE VISION CORRECTION FOR DEVICES USING EYE TRACKING DEVICE

CROSS-REFERENCE TO RELATED APPLICATIONS

This application is a national phase application under 35 U.S.C. § 371 of International Application No. PCT/EP2021/079682 filed 26 Oct. 2021, which claims priority to European Patent Application No. 20306282.3 filed 27 Oct. 2020. The entire contents of each of the above-referenced disclosures is specifically incorporated by reference herein without disclaimer.

FIELD OF THE INVENTION

The present invention relates to an optical article comprising a multilayered interferential coating, and especially an antireflective coating which strongly reduces reflection both in the visible region (i.e.: 380 to 780 nm) and in the near infrared (NIR) region, especially for wavelengths ranging approximately from 900 to 2000 nm, while being at the same time compatible with an Eye Tracker (ET) system working in the infrared wavelengths. The optical article may especially be an ophthalmic lens, such as a spectacle lens.

The present invention also relates to an optical device comprising notably said optical article and that may be suitable for instance for forming an augmented reality device, a virtual reality device or an eye tracking device.

DESCRIPTION OF RELATED ART

The NIR range is commonly used for light illuminating the eye for the purpose of eye tracking, because NIR light is not visible by the user and, at the same time, allows very good contrast on the pupil, which makes it possible to obtain high accuracy and high reliability of eye gaze direction or eye motion measurements, or of any other measurements such as relating to pupil size and position, eye reflections on cornea surfaces, eye lens surfaces, eye lid, etc.

Such measurements may be made through specific optical device, comprising a deep red and NIR light source and a video camera, in addition to ophthalmic lenses.

However, when the deep red and NIR light source sends light towards the eye of a user wearing such equipment, multiple reflections occur on the faces of the ophthalmic lenses. Such multiple reflections generate noise for the detector of the camera, which will then be unable to properly locate the pupil.

For instance, the document US 2018/003961 describes a projection system (see FIG. 4 of this document). The projection system includes a projection surface (such as a lens), an infrared (IR) light beam emitter (IR source) and an infrared light beam receiver that receives IR light coming from the eye of a user. A holographic optical element (HOE), incorporated into the projection surface, reflects light to the eye or coming to the eye. Hence, in this document, a reflective solution is proposed to track the eye. The user can see real world through the projection surface and also a virtual image can be displayed via the holographic optical element and visible additional light sources. However, in this projection system, there is a need to provide an antireflective coating on the projection surface. Indeed, the reflections coming from this projection surface are likely to degrade the image quality (formation of ghost image) and are likely to limit the Eye Tracking (ET) performance.

As used herein and as illustrated on FIG. 1, a ghost image 3 is a physical phenomenon of internal reflection inside a lens 1. It is only visible for lenses with dioptric power or prism because it separates the ghost image 3 from the image of the light source 2. The ghost image 3 is visible when looking at a light source through a lens 1. Depending on its color and intensity, it can be a source of discomfort for the wearer.

The document US 2018/113508 describes an eye tracking system for virtual and mixed or augmented reality (VR/AR) head-mounted displays (HMDs). In particular, the eye tracking system may include a display to display images and two eyepiece lenses, mounted in a wearable housing. This display could be transparent and hence allow also the user to see the real world. A user looks through the eyepiece lenses onto the display. The eyepiece lenses form a virtual image of the displayed content at a design distance which is typically close to optical infinity of the eyepieces lenses. IR cameras capture the user face through the eyepiece lenses. However, in this document, ghost images may also be created due to the reflection on the lens surfaces.

Thus, it is a need to provide an optical article for virtual and mixed or augmented reality (VR/AR) head-mounted displays (HMDs) that enables a correct refraction to the wearer/user of this HMD. In particular, there is a need to provide an optical article that is able to limit the ghost images of the user of an ET system working in the IR wavelengths, while being compatible with it (reflective or transmitive ET system), i.e.: that is sufficiently transparent to IR wavelengths used by ET to limit the power consumption required for the ET illumination system.

There is also a need to provide an optical article for VR/AR HMDs that limits the IR light that may reach the eyes of the user and that coming from the outside environment of the HMDs (named hereafter "outside IR"). Indeed, as it is known, IR light may lead to visual problem, such as an increase of cataract risk, dry eyes syndrome, tear film alteration, etc. In addition, the reduction of IR light, especially near Infrared light (NIR), coming from the environment is also a way to balance the additional NIR light provided by the ET system, so that the global NIR light coming to the eyes remaining unchanged or improved (i.e.: globally reduced even when using an eyetracker).

Indeed, using conventional solutions to preserve the eyes from outside IR may lead to poor performance for ET system using IR wavelengths, or reversely using efficient ET solution may lead to poor solution for preserving eyes from outside IR. Indeed, for instance, any available NIR reflective stack designed to reduce outside IR would create very disturbing ghost images for the ET system if they were not designed correctly, whereas any available NIR reflective stack designed to limit reflection for IR range used in eye tracking would not reject outside IR if they were not designed correctly. Another solution consists in adding absorption dye into the lens. However, if eyetrackers were illuminating or imaging the eyes through a lens, any available absorption dye would lead to poor transparency for transmitive ET system, and so would require higher level of power to illuminate the eye with the IR sources.

In addition, it is also important for the wearer comfort of the optical article to limit the reflection in the visible region ranging from 380 nm to 780 nm.

Therefore, there is a need to provide novel interferential coatings for optical article intended to be used in an augmented reality device, a virtual reality device or an eye tracking device that satisfy at least one and preferably all of the above-mentioned problems.

SUMMARY OF THE INVENTION

An object of the invention is therefore to remedy the above drawbacks, by seeking to develop a transparent optical article, especially an ophthalmic lens such as spectacle lens, comprising a substrate in mineral or organic glass comprising at least an interferential coating, such an antireflective coating, said antireflective coating possessing very good antireflective performances in the visible region, while having also very specific reflections in the NIR region and to do so without compromising the economic and/or industrial feasibility of its manufacture.

The invention therefore relates to an optical article, preferably an ophthalmic lens, comprising a transparent substrate with a front main face and with a rear main face, at least one of the main faces being coated with a multilayered interferential coating comprising a stack of at least one high refractive index layer (HI) having a refractive index higher than or equal to 1.55 and at least one low refractive index layer (LI) having a refractive index layer lower than 1.55, wherein said multilayered interferential coating has or imparts to the optical article:

a mean light reflection factor in the visible region, noted $R_v$, that is lower than or equal to 2.5% for at least an angle of incidence lower than or equal to 35°;

a mean reflection factor for wavelengths ranging from 800 nm to 900 nm, noted $R_m^{ET}{}_{(800-900)}$, that is lower than or equal to 1.5% at an angle of incidence lower than or equal to 20°, characterized in that:

said multilayered interferential coating has a mean reflection factor in the near infrared (NIR) region ranging from 900 nm to 2000 nm, noted $R_m^{NIR}$, that is higher than or equal to 12% at an angle of incidence lower than or equal to 20° and/or said transparent substrate comprises at least one absorbing dye which absorbs in the near infrared region at a wavelength ranging from 900 to 2000 nm.

Therefore, the optical article according to the invention comprises a highly efficient multilayered interferential coating with very low reflection in the visible region, very low reflection in the NIR range used in conventional eyetrackers, i.e.: from 800 to 900 nm (named hereafter $R_m^{ET}{}_{(800-900)}$) and high reflection in the NIR region ranging from 900 to 2000 nm that may come notably from the outside environment of the optical article wearer/user.

Hence, the multilayered interferential coating of the invention enables to cut the potentially harmful IR light coming from the environment of the optical article wearer/user so as to preserves the eyes, while providing good performance (no cutting) for NIR light used in Eye Tracker (ET) system so as to preserve ghost images and high-power consumption of the ET illumination system.

The invention also provides an optical device that may be an augmented reality device, a virtual reality device and an eye tracking device, comprising such an optical article such as described above and a light source emitting in the deep red and near infrared region.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
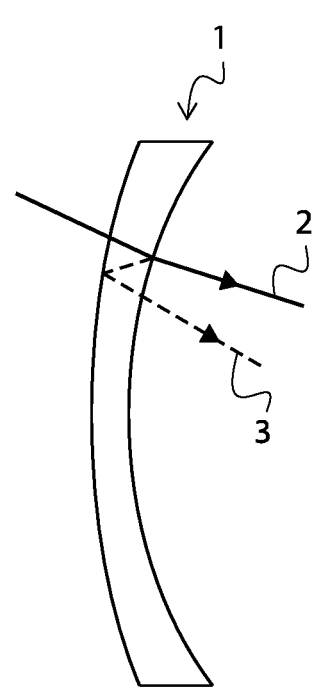
FIG. 1 is a schematic view of a lens 1 showing the path of a direct image 2 (image of the light source) and the path of the ghost image 3 through the lens 1.

In the description which follows, the drawing figures are not necessarily to scale and certain features may be shown in generalized or schematic form in the interest of clarity and conciseness or for informational purposes. In addition, embodiments discussed herein are merely representative and do not limit the scope of the invention.

1. Definitions

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, reaction conditions, etc. used herein are to be understood as modified in all instances by the term "about."

Also unless otherwise indicated, the indication of an interval of values «from X to Y» or "between X to Y", according to the present invention, means as including the values of X and Y. In addition, unless otherwise indicated, for an interval of values, the expression "lower than X" or "higher than Y", does not comprise the value of X or Y.

In the present application, when an optical article comprises one or more coatings onto the surface thereof, the expression "to deposit a layer or a coating onto the article" is intended to mean that a layer or a coating is deposited onto the external (exposed) surface of the outer coating of the article, that is to say its coating that is the most distant from the substrate.

A coating, that is said to be "on" a substrate or deposited "onto" a substrate is defined as a coating, which (i) is positioned above the substrate, (ii) is not necessarily in contact with the substrate, that is to say one or more intermediate coatings may be arranged between the substrate and the coating in question, and (iii) does not necessarily completely cover the substrate.

In a preferred embodiment, the coating on a substrate or deposited onto a substrate is in direct contact with this substrate.

When "a layer 1 is lying under a layer 2", it is intended to mean that layer 2 is more distant from the substrate than layer 1.

According to the embodiments described hereafter, the multilayered interferential coating is preferably a multilayered antireflective coating. Hence, for the rest of the description, these two terms are similar.

By outermost layer of the multilayered antireflective coating, it is meant the layer of the anti-reflection (AR) coating which is the furthest from the substrate.

By innermost layer of the multilayered antireflective coating, it is meant the layer of the anti-reflection coating which is the closest to the substrate.

By inner layer of the multilayered antireflective coating, it is meant any layer of the anti-reflection coating except for the outermost layer of said AR coating.

Also, unless stated otherwise, all thicknesses disclosed in the present application relate to physical thicknesses.

The terms multilayered antireflective coating or AR coating and AR stack have the same meaning.

Unless otherwise specified, the refractive indexes referred to in the present application are expressed at 25° C. at a wavelength of 550 nm.

The multilayered antireflective coating according to the invention may be formed on at least one of the main faces of a bare substrate, i.e. an uncoated substrate, or at least one of the main faces of the substrate already coated with one or more functional coatings, such as an anti-abrasion coating.

As used herein, the rear (or the inner or Concave or CC) face of the substrate is intended to mean the face which, when using the article, is the nearest from the wearer's eye. It is generally a concave face. On the contrary, the front face of the substrate (or Convex or CX), is the face which, when using the article, is the most distant from the wearer's eye. It is generally a convex face.

Also, as used herein, a "transparent substrate" is understood to be transparent, when the observation of an image through said substrate is perceived with no significant loss of contrast, that is, when the formation of an image through said substrate is obtained without adversely affecting the quality of the image.

The term cosmetic appearance means that there is no, or almost no, cosmetic defects over time evaluated visually in transmission and is preferably measured under an arc lamp.

The term "robustness" of an optical article, such as an ophthalmic lens, in the present invention is defined as the ability of this lens to resist change despite the variations induced by its manufacture process. These variations depends, for instance, on the type of substrate which is used, the setting of the manufacturing machine (temperature schedule, appropriate time, setting of the electron gun . . . ) and/or its usage mode, the replacement of said manufacturing machine by another one.

Indeed, when a multilayered antireflective coating is manufactured at industrial scale, some thickness variations for each layer generally occur. These variations lead to different reflection performance, and especially different perceived residual reflected color of the multilayered antireflective coating. If the perceived residual reflected color of the antireflective coating of two lenses is different, these lenses will appear different and will not be able to be associated in pair.

According to the invention, the "angle of incidence (symbol $\theta$)" is the angle formed by a ray light incident on an ophthalmic lens surface and a normal to the surface at the point of incidence. The ray light is for instance an illuminant light source, such as the standard illuminant D65 as defined in the international colorimetric CIE L*a*b* (1976). Generally the angle of incidence changes from 0° (normal incidence) to 90° (grazing incidence). The usual range for angle of incidence is from 0° to 75°.

The Tv factor, also called "luminous transmission" of the system, is such as defined in ISO 8980-3: 2013 standard and relates to an average in the 380-780 nm wavelength range that is weighted according to the sensitivity of the eye at each wavelength of the range and measure under D65 illumination conditions (daylight).

In the present invention, unless otherwise specified, transmittances/transmissions are measured at the center of the optical article for a thickness ranging from 0.7 to 2 mm, preferably from 0.8 to 1.5 mm, at an angle of incidence ranging from 0° to 15°, preferably 0°. As used herein, the light transmitted refers to light arriving on the front main surface of the optical article and that went through the lens.

The average transmittance factor, abbreviated Tm, is such as defined in ISO 13666:1998 standard, and measured according to ISO 8980-4 standard (generally at an angle of incidence of less than 17°, typically of 15°), i.e. it represents the spectral transmission (unweighted) average within the whole light spectrum of from 380 nm to 780 nm.

By analogy, an average transmission factor also called "luminous transmission" of the system, is defined between 800 nm to 900 nm, abbreviated "$T_m^{ET}{}_{(800-900)}$", which corresponds to the spectral transmission (unweighted) average within the wavelength range from 800 nm to 900 nm.

Also and by analogy, an average transmission factor also called "luminous transmission" of the system, is defined between 900 nm to 1500 nm, abbreviated "$T_{m(900-1500)}$", which corresponds to the spectral transmission (unweighted) average within the wavelength range from 900 nm to 1500 nm.

Herein, the "luminous reflectance" noted $R_v$, is such as defined in the ISO 13666:1998 Standard, and measured in accordance with the ISO 8980-4, i.e.: this is the weighted spectral reflection average over the whole visible spectrum between 380 and 780 nm. $R_v$ is usually measured for an angle of incidence lower than 17°, typically of 15°, but can be evaluated for any angle of incidence.

In the present application, the "mean reflection factor," noted $R_{m\,(X-Y)}$, is such as defined in the ISO 13666:1998 Standard, and measured in accordance with the ISO 8980-4 Standard, i.e. this is the (non weighted) spectral reflection average over the electromagnetic spectrum between the wavelength "X" and "Y" nm. According the invention, $R_m$ is measured for different angle of incidence.

For instance, the characteristic mean reflection factor for wavelengths ranging from 800 nm to 900 nm, noted $R_m^{ET}{}_{(800-900)}$ is defined by the formula and assuming a measurement step of 1 nm:

$$R_{m}{}^{ET}{}_{(800-900)} = \frac{\int_{800}^{900} R(\lambda)d\lambda}{900 - 800}$$

wherein $R(\lambda)$ represents the reflection factor at wavelength $\lambda$.

$R_{m}{}^{ET}{}_{(800-900)}$ can be measured for any angle of incidence $\theta$, based on $R(\lambda)$ measured at the same angle of incidence. Preferably, the angle of incidence ranges between 0° to 20° and is 0°.

The same applies for a mean reflection factor for wavelengths ranging from 800 nm to 950 nm, noted $R_{m}{}^{ET}{}_{(800-950)}$.

Herein, the characteristic mean reflection factor in the near infrared (NIR) region $R_{m}{}^{NIR}{}_{(900-2000)}$ is defined by the formula:

$$R_{m}{}^{NIR} = \frac{\int_{900}^{2000} R(\lambda)d\lambda}{2000 - 900}$$

wherein $R(\lambda)$ represents the reflection factor at wavelength $\lambda$. $R_{m}{}^{NIR}$ can be measured for any angle of incidence $\theta$, based on $R(\lambda)$ measured at the same angle of incidence. Preferably, the angle of incidence ranges between 0° to 20° and is 0°.

By analogy, the characteristic mean reflection factor in the near infrared (NIR) region $R_{m}{}^{NIR}{}_{(900-1500)}$ is defined by the formula:

$$R_{m}{}^{NIR} = \frac{\int_{9000}^{1500} R(\lambda)d\lambda}{1500 - 900}$$

wherein $R(\lambda)$ represents the reflection factor at wavelength $\lambda$. $R_{m}{}^{NIR}$ can be measured for any angle of incidence $\theta$, based on $R(\lambda)$ measured at the same angle of incidence. Preferably, the angle of incidence ranges between 0° to 20° and is 0°.

The same applies for a mean reflection factor in the near infrared (NIR) region ranges from 950 to 1500 nm, noted hereafter $R_{m}{}^{NIR}{}_{(950-1500)}$.

2. Optical Article

The optical article according to the present invention is a transparent optical article, preferably a lens or lens blank, and more preferably an ophthalmic lens or lens blank. The optical article may be coated on its convex main side (front side), concave main side (back side), or both sides with the multilayered antireflective coating of the invention.

Preferably, the multilayered antireflective coating of the invention is coated on the front main side and on the back main side of the optical article.

A°) The Substrate

Generally speaking, the interferential multilayered coating of the optical article according to the invention, which may be an antireflective coating (called hereafter AR coating), may be deposited onto any substrate, and preferably onto organic lens substrates, for example a thermoplastic or thermosetting plastic material.

Thermoplastic may be selected from, for instance: polyamides; polyimide; polysulfones; polycarbonates and copolymers thereof; poly(ethylene terephthalate) and polymethylmethacrylate (PMMA).

Thermoset materials may be selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth) acrylic acid and esters thereof, polymer and copolymer of allyl esters which may be derived from Bisphenol A or phthalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate. As used herein, a polycarbonate (PC) is intended to mean either homopolycarbonates or copolycarbonates and block copolycarbonates.

Homopolymers of diethylene glycol bis(allyl carbonate) (CR 39®), allylic and (meth)acrylic copolymers, having a refractive index between 1.54 and 1.58, polymer and copolymer of thiourethane, polycarbonates are preferred.

The substrate may be coated with one or more functional coatings prior to depositing the antireflective coating of the invention. These functional coatings traditionally used in optics may be, without limitation, an impact-resistant primer layer, an abrasion-resistant coating and/or a scratch-resistant coating, a polarizing coating, a photochromic coating or a tinted coating. In the following a substrate means either a bare substrate or such a coated substrate.

Preferably, the substrate and the optional abrasion-resistant coating and/or a scratch-resistant coating generally coated onto said substrate have a similar/close refractive index so as to avoid fringes or cosmetic defects.

Prior to depositing the antireflective coating, the surface of said substrate is usually submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC") or with an electron beam, a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

B°) The Multilayered Antireflective Coating

The multilayered antireflective coating of the invention will be now described hereafter.

As previously mentioned, the multilayered antireflective coating (AR coating) of the invention has a specific reflection spectrum.

Indeed, first it has or imparts to the optical article a low reflection for wavelengths ranging from 380 nm to 900 nm and even ranging from 380 nm to 950 nm, i.e.: this range includes therefore the visible region ranging from 380 nm to 780 nm, but also a part of the NIR region ranging either from 780 nm to 900 nm or from 780 nm to 950 nm.

Hence, according to a first characteristic of the invention, the AR coating has or imparts to the optical article a mean light reflection factor in the visible region (380-780 nm), noted $R_{v}$, that is lower than or equal to 2.5% for at least an angle of incidence lower than or equal to 35° and preferably equal to 35°.

According to the invention, "a mean light reflection factor in the visible region (380-780 nm), noted $R_v$, that is lower than or equal to 2.5%" includes the following values and/or any intervals comprised between these values: 2.5; 2.4; 2.3; 2.3; 2.2; 2.1; 2.0; 1.9; 1.8; 1.7; 1.6; 1.5; 1.4; 1.3; 1.2; 1.1; 1.0; 0.95; 0.90; 0.85; 0.80; 0.75; 0.70; 0.65; 0.60; 0.55; 0.50; 0.45; etc.

Preferably, the mean light reflection factor in the visible region $R_v$ is lower than or equal to 2.0%, preferably lower than or equal to 1.5%, more preferably lower than or equal to 1.0%, and typically lower than or equal to 0.9% at an angle of incidence lower than or equal to 35°.

In general, the mean light reflection factor in the visible region $R_v$ is lower than or equal to 0.8%, preferably lower than or equal to 0.7%, more preferably lower than or equal to 0.65%, typically lower than or equal to 0.60%, such as lower than or equal to 0.55% at an angle of incidence lower than or equal to 35°.

In addition, the luminous transmission (transparency), i.e.: Tv factor, measured at a wavelength ranging from 380-780 nm, is higher than or equal to 82%.

According to an embodiment, Tv is higher than or equal to 83%, preferably higher than or equal to 84%, in particular higher than or equal to 85% at an angle of incidence lower than or equal to 20°.

According to another embodiment, Tv is higher than or equal to 86%, preferably higher than or equal to 87%, in particular higher than or equal to 90%, such as 95%, at an angle of incidence lower than or equal to 20°.

These characteristics of the AR coating of the invention (i.e.: low Rv and high Tv) enable to improve the vision correction of the optical article intended to be used in an ET device such as virtual and mixed or augmented reality (VR/AR) head-mounted displays (HMDs) and especially improve both the transparency of the optical article and the visual comfort of the wearer.

Also, according to a second characteristic of the invention, the AR coating has or imparts to the optical article a low reflection in the part of the NIR range used in ET systems, that is to say for wavelengths ranging from 800 to 900 nm and even ranging from 800 to 950 nm or from 800 to 1000 nm.

Thus, the mean reflection factor for wavelengths ranging from 800 nm to 900 nm, noted $R_m^{ET}{}_{(800\text{-}900)}$ of the AR coating of the invention is lower than or equal to 1.5% at an angle of incidence lower than or equal to 20°, preferably ranging from 0° to 20° and typically for an angle of incidence of 0°.

According to the invention, "a mean reflection factor for wavelengths ranging from 800 nm to 900 nm, noted $R_m^{ET}{}_{(800\text{-}900)}$, that is lower than or equal to 1.5%" includes the following values and/or any intervals comprised between these values: 1.5; 1.4; 1.3; 1.2; 1.1; 1.0; 0.95; 0.90; 0.85; 0.80; 0.75; 0.70; 0.65; 0.60; 0.55; 0.50; 0.45; 0.40; 0.35; 0.30; 0.25; 0.20; etc.

Preferably, the mean reflection factor $R_m^{ET}{}_{(800\text{-}900)}$ is lower than or equal to 1%, preferably lower than or equal to 0.9%, typically lower than or equal to 0.8% and in particular lower than or equal to 0.7% such as lower than or equal to 0.65%, at an angle of incidence lower than or equal to 20°, preferably ranging from 0° to 20° and typically for an angle of incidence of 0°.

In general, the mean reflection factor for wavelengths ranging from 800 nm to 950 nm, noted $R_m^{ET}{}_{(800\text{-}950)}$ of the AR coating of the invention may be lower than or equal to 1.5% at an angle of incidence lower than or equal to 20°, preferably ranging from 0° to 20° and typically for an angle of incidence of 0°.

According to the invention, "a mean reflection factor for wavelengths ranging from 800 nm to 900 nm, noted $R_m^{ET}{}_{(800\text{-}900)}$, that is lower than or equal to 1.5%" includes the following values and/or any intervals comprised between these values: 1.5; 1.4; 1.3; 1.2; 1.1; 1.0; 0.95; 0.90; 0.85; 0.80; etc.

Preferably, the mean reflection factor $R_m^{ET}{}_{(800\text{-}950)}$ may be lower than or equal to 1.5%, preferably lower than or equal to 1.3%, more preferably lower than or equal to 1.2% and typically lower than or equal to 1.0% at an angle of incidence lower than or equal to 20°, preferably ranging from 0° to 20° and typically for an angle of incidence of 0°.

In addition, the mean reflection factor for wavelengths ranging from 800 nm to 1000 nm, noted $R_m^{ET}{}_{(800\text{-}1000)}$ of the AR coating of the invention may be lower than or equal to 1.5% at an angle of incidence lower than or equal to 20°, preferably ranging from 0° to 20° and typically for an angle of incidence of 0°.

According to the invention, "a mean reflection factor for wavelengths ranging from 800 nm to 1000 nm, noted $R_m^{ET}{}_{(800\text{-}1000)}$, that is lower than or equal to 1.5%" includes the following values and/or any intervals comprised between these values: 1.5; 1.4; 1.3; 1.2; 1.1; 1.0; 0.95; 0.90; 0.85; 0.80; etc.

Preferably, the mean reflection factor $R_m^{ET}{}_{(800\text{-}1000)}$ may be lower than or equal to 1.5%, preferably lower than or equal to 1.3%, more preferably lower than or equal to 1.2% and typically lower than or equal to 1.0% at an angle of incidence lower than or equal to 20°, preferably ranging from 0° to 20° and typically for an angle of incidence of 0°.

This characteristic of the AR coating of the invention (i.e.: low $R_m^{ET}{}_{(800\text{-}900)}$ or low $R_m^{ET}{}_{(800\text{-}950)}$ and even low $R_m^{ET}{}_{(800\text{-}1000)}$) enables to avoid disturbance reflections or ghost images when the optical article of the invention is used within a VR/AR head-mounted display or ET system.

According to a characteristic of the invention, the AR coating has or imparts to the optical article a low Rv that is lower than or equal to 0.65% and a lower $R_m^{ET}{}_{(800\text{-}900)}$ that is lower than or equal to 0.65% at an angle of incidence ranging from 0° to 20°. In addition, the AR coating has or imparts to the optical article a high transmission factor for wavelengths ranging from 800 nm to 900 nm (i.e.: NIR range used in ET systems).

Indeed, the optical article has an average transmission factor for wavelengths ranging from 800 nm to 900 nm, noted $T_m^{ET}{}_{(800\text{-}900)}$, that is higher than or equal to 60%, preferably higher than or equal to 70% and in particular higher than or equal to 75% at an angle of incidence lower than or equal to 20°, preferably ranging from 0° to 20°.

According to an embodiment, the average transmission factor $T_m^{ET}{}_{(800\text{-}900)}$ is higher than or equal to 80%, preferably higher than or equal to 83%, in particular higher than or equal to 84% at an angle of incidence lower than or equal to 20°.

According to another embodiment, the average transmission factor $T_m^{ET}{}_{(800\text{-}900)}$ is higher than or equal to 86%, preferably higher than or equal to 88%, in particular higher than or equal to 90%, such as 95%, at an angle of incidence lower than or equal to 20°.

This high transmission in the part of the NIR used for ET systems (i.e.: high $T_m^{ET}{}_{(800\text{-}900)}$) enables to limit the power consumption that is useful for ET illumination systems.

Then, according to a third characteristic of the invention, the AR coating or the optical article has a high reflection for wavelengths of the NIR region equal to or higher than 900 or 950 nm, i.e.: ranging from 900-1500 nm and/or even ranging from 900 to 2000 nm and/or ranging from 950 to 1000 nm and/or from 950 to 1500 nm. Indeed, this NIR cut enables to protect the eyes of the wearer of the optical article of the IR light coming from the outside environment of the ET system or the VR/AR head-mounted display.

So as to reach this characteristic, two configurations are proposed by the invention.

According to a first configuration A (reflection), the multilayered interferential coating may also have a mean reflection factor in the near infrared (NIR) region ranging from 900 nm to 2000 nm, noted $R_m^{NIR}$, that is higher than or equal to 11.5% at an angle of incidence lower than or equal to 20°, preferably ranging from 0° to 20°.

Preferably, the AR coating has a mean reflection factor in the near infrared $R_m^{NIR}$ that is higher than or equal to 12%, preferably higher than or equal to 13%, more preferably higher than or equal to 15%, typically higher than or equal to 20% and in particular higher than or equal to 30%, such as higher than or equal to 40% at an angle of incidence lower than or equal to 20°.

As used herein, a mean reflection factor in the near infrared (NIR) region ranging from 900 nm to 2000 nm $R_m^{NIR}$ that is higher than or equal to 11.5% includes the following values and/or any intervals comprised between these values (limits included): 11.5; 12; 12.5; 13; 13.5; 14; 14.5; 15; 15.5; 16.5; 17; 17.5; 18; 18.5; 19; 19.5; 20; 21; 22; 23; 24; 25; 26; 27; 28; 29; 30; 31; 32; 33; 34; 35; 36; 37; 38; 39; 40, etc.

Especially, according to this configuration A, the multilayered interferential coating may also have a mean reflection factor in the near infrared (NIR) region ranging from 950 nm to 1500 nm, noted $R_m^{NIR}(950\text{-}1500)$, that is higher than or equal to 11.5% at an angle of incidence lower than or equal to 20°, preferably ranging from 0° to 20°.

For instance, the $R_m^{NIR}(950\text{-}1500)$ may be is higher than or equal to 12%, preferably higher than or equal to 13%, more preferably higher than or equal to 15%, typically higher than or equal to 20% and in particular higher than or equal to 25%, at an angle of incidence lower than or equal to 20°.

As used herein, a $R_m^{NIR}(950\text{-}1500)$ that is higher than or equal to 11.5% includes the following values and/or any intervals comprised between these values (limits included): 11.5; 12; 12.5; 13; 13.5; 14; 14.5; 15; 15.5; 16.5; 17; 17.5; 18; 18.5; 19; 19.5; 20; 21; 22; 23; 24; 25; etc.

In addition, according to this configuration A, the multilayered interferential coating may also have a mean reflection factor in the near infrared (NIR) region ranging from 950 nm to 1000 nm, noted $R_m^{NIR}(950\text{-}1000)$, that is higher than or equal to 11.5% at an angle of incidence lower than or equal to 20°, preferably ranging from 0° to 20°.

For instance, the $R_m^{NIR}(950\text{-}1000)$ may be is higher than or equal to 12%, preferably higher than or equal to 13%, more preferably higher than or equal to 15%, typically higher than or equal to 20% and in particular higher than or equal to 25%, at an angle of incidence lower than or equal to 20°.

As used herein, a $R_m^{NIR}(950\text{-}1000)$ that is higher than or equal to 11.5% includes the following values and/or any intervals comprised between these values (limits included): 11.5; 12; 12.5; 13; 13.5; 14; 14.5; 15; 15.5; 16.5; 17; 17.5; 18; 18.5; 19; 19.5; 20; 21; 22; 23; 24; 25; etc.

According to a second configuration B (absorption), the transparent substrate may comprise at least one absorbing dye which absorbs in the near infrared region at a wavelength ranging from 900 to 2000 nm.

According to the invention, the expression "the transparent substrate may comprise at least one absorbing dye" means that the absorbing dye can be incorporated directly into the substrate and/or is incorporated in one coating deposited directly at the surface of the transparent substrate. The method to incorporate a dye into or onto a substrate is well known from the skilled person and therefore, will not be described in detail hereafter in European patent EP 3327488A1. This patent describes various methods to incorporate a dye into an epoxy coating deposited onto the surface of the optical articles or any other substrate.

In general, said at least one absorbing dye is able to transmits at least 50%, preferably at least 60% of the light having a wavelength ranging from 800 to 900 nm, preferably ranging from 700 to 1000 nm arriving at least on one of the main faces of the substrate and blocks at least 30%, preferably 40% of the light having a wavelength ranging from 1000 to 1500 nm arriving at least on one of the main faces of the substrate.

Hence, the absorbing dye according to the invention is a selective dye which absorbs specifically in NIR region to have lowest color value and high NIR absorption.

Advantageously, the at least one absorbing dye has a minimum absorption in the visible region (380-780 nm).

In general, the at least one dye may be selected among the following families of components: perlene, polymethines (ex. cyanines, squaraines, croconaines) diimonium, phthalocyanine, napthalocyanines, dithiolene and other metal complex, newer structure querterline diimides and mixture thereof.

Besides, these organic substances, there are other inorganic substances such as lanthanum hexaboride, Indium tin oxide, antimony tin oxide in nano particulate form and coated mica materials. However, organic materials are more selective in NIR region.

Preferably, the at least one dye that is suitable for the invention comprises cyanine chemistry. For instance, the dye commercialized under the tradename S2007 by Few Chemicals GmbH is appropriate for the current invention.

Of course, these two configurations A and B may be combined (combination of an AR coating with a high $R_m^{NIR}$ and of a transparent substrate comprising a specific dye absorbing in the near infrared region at a wavelength ranging from 900 to 2000 nm).

In addition, the optical article of the invention may comprise the following characteristics.

According to a characteristic of the invention, the optical article may have an average transmission factor for wavelengths ranging from 900 nm to 1500 nm, noted $T_{m(900\text{-}1500)}$, that is lower than or equal to 80%, preferably lower than or equal to 75% and typically lower than or equal to 65% at an angle of incidence lower than or equal to 20°.

According to another characteristic of the invention, the optical article may have a $T_{m(900\text{-}1500)}$ that lower than or equal to 50%, preferably lower than or equal to 45% and typically lower than or equal to 35% at an angle of incidence lower than or equal to 20°. As used herein, a $T_{m(900\text{-}1500)}$ lower than or equal to 80% includes the following values and/or any intervals comprised between these values (limits included): 80; 79; 78; 77; 76; 75; 74; 73; 72; 71; 70; 69; 68; 67; 66; 65; 64; 63; 62; 61; 60; 59; 58; 57; 56; 55; 54; 53; 52; 51; 50; 49; 48; 47; 46; 45; 44; 43; 42; 41; 40; 39; 38; 37; 36; 35; etc.

Hence, the solution proposed by the invention enables to limit the power consumption that is useful for ET illumination systems (thanks to a high transmission in the part of the NIR used for ET systems, i.e.: high $T_m^{ET}{}_{(800\text{-}900)}$), while also limiting ghost images in this part of the NIR (low $R_m^{ET}{}_{(800\text{-}900)}$) and at the same time suppressing or reducing NIR light (900-1500 nm or 900-2000 nm) coming from the outside environment of the user/wearer that would be harmful to his/her eyes.

For that purpose, the Applicant has surprisingly discovered that the AR coating according to the invention enables to obtain both low reflectance in the visible region and in the part of the NIR range used in ET systems (i.e.: 800-900 nm), while being at the same time able to have or to impart to the optical article a high reflection in the NIR region (i.e. 900-1500 nm or 900 to 1500 nm) that is potentially harmful to the eyes of the wearer. Alternatively or in combination, the optical article may comprise a dye that is able to absorb in this wavelength range (i.e.: 900-2000 nm).

Different structures of the multilayered antireflective coating of the invention (whatever the embodiments described above) will be now described.

As previously mentioned, the multilayered antireflective coating of the invention comprises a stack of at least two layers made of dielectric materials having a high refractive index (HI) and a low refractive index (LI).

Preferably, the antireflective coating comprises at least two layers and especially at least three layers with a low refractive index (LI), and at least two layers and especially at least three layers with a high refractive index layer (HI). It is here a simple stack, since the layer total number in the antireflective coating is higher than or equal to 4 and in general lower than or equal to 14.

According to a characteristic of the invention, the layer total number in the antireflective coating is higher than or equal to 4, more preferably higher than or equal to 5, typically higher than or equal to 6.

According to another characteristic of the invention, the layer total number in the antireflective coating is lower than or equal to 14, more preferably lower than or equal to 12, even more preferably lower than or equal to 10.

As used herein, a layer of the antireflective coating is defined as having a thickness higher than or equal to 1 nm. Thus, any layer having a thickness lower than 1 nm will not be considered when counting the number of layers in the antireflective coating. A sub-layer such as described hereafter either is not considered when counting the number of layers of the antireflective coating.

HI layers and LI layers don't need to alternate with each other in the stack, although they also may, according to one embodiment of the invention. Two HI layers (or more) may be deposited onto each other, as well as two LI layers (or more) may be deposited onto each other.

In general, the HI layers and LI layers alternate with each other in the stack of the AR coating according to the invention.

Advantageously, the AR coating comprises alternately HI layers and LI layers and has a number of layers higher than or equal to 4, preferably higher than or equal to 5 and especially higher than or equal to 6.

Preferably, the antireflective coating total thickness is lower than or equal to 450 nm, more preferably lower than or equal to 400 nm and even more preferably lower than or equal to 370 nm. The antireflective coating total thickness is generally higher than 250 nm, preferably higher than or equal to 300 nm. Typically, the physical thickness of said antireflective coating is ranging from 300 to 370 nm.

As used herein, an interval lower than or equal to 450 nm includes the following values and/or any intervals comprised between these values (limits included): 450; 440; 430; 420; 410; 400; 390; 380; 370; 360; 350; 340; 330; 320; 310; 300; 290; 280; 270; 260; 250; etc.

Unless stated otherwise, all thicknesses disclosed in the present application relate to physical thicknesses.

According to a first aspect of the invention, the AR coating comprises at least, in the direction moving away from said substrate:

one HI layer having a physical thickness of from 8 nm to 25 nm, preferably from 10 nm to 20 nm;

one LI layer having a physical thickness of from 15 nm to 50 nm, preferably from 20 nm to 40 nm;

one HI layer having a physical thickness of from 110 nm to 200 nm, preferably from 150 nm to 175 nm;

one LI layer having a physical thickness of from 80 nm to 130 nm, preferably from 90 nm to 125 nm.

According to a second aspect of the invention, the AR coating comprises at least, in the direction moving away from said substrate:

one HI layer having a physical thickness of from 8 nm to 25 nm, preferably from 10 nm to 20 nm;

one LI layer having a physical thickness of from 20 nm to 60 nm, preferably from 30 nm to 50 nm;

one HI layer having a physical thickness of from 50 nm to 95 nm, preferably from 65 nm to 85 nm;

one LI layer having a physical thickness of from 1 nm to 15 nm, preferably from 3 nm to 8 nm;

one HI layer having a physical thickness of from 50 nm to 90 nm, preferably from 60 nm to 80 nm;

one LI layer having a physical thickness of from 80 nm to 130 nm, preferably from 90 nm to 125 nm.

According to a third aspect of the invention, the AR coating further comprises at least one continuous metallic layer made of at least one or more metals selected from Silver (Ag), Aluminium (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (N), Zinc (Zn) or Zirconium (Zr); or combination thereof, and is preferably Gold (Au).

Generally, this continuous metallic layer has a physical thickness ranging from 1 nm to 10 nm, preferably from 1.5 nm to 8 nm.

In particular, according to this aspect, the AR coating comprises at least, in the direction moving away from said substrate:

one HI layer having a physical thickness of from 8 nm to 40 nm, preferably from 10 nm to 30 nm;

one LI layer having a physical thickness of from 8 nm to 60 nm, preferably from 10 nm to 45 nm;

one HI layer having a physical thickness of from 170 nm to 240 nm, preferably from 180 nm to 225 nm;

the at least one continuous metallic layer having a physical thickness of from 1 nm to 10 nm, preferably from 1.5 nm to 8 nm;

an optional HI layer having a physical thickness of from 8 nm to 40 nm, preferably from 10 nm to 30 nm;

one LI layer having a physical thickness of from 50 nm to 110 nm, preferably from 55 nm to 100 nm.

According to the invention, "a HI layer having a physical thickness of from 8 nm to nm" includes the following values and/or any intervals comprised between these values: 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40.

According to the invention, "a LI layer having a physical thickness of from 8 nm to 60 nm" includes the following values and/or any intervals comprised between these values: 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 41; 42; 43; 44; 45; 46; 47; 48; 49; 50; 51; 52; 53; 54; 55; 56; 57; 58; 59; 60.

According to the invention, "a HI layer having a physical thickness of from 170 nm to 240 nm" includes the following values and/or any intervals comprised between these values: 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201; 202; 203; 204; 205; 206; 207; 208; 209; 210; 211; 212; 213; 214; 215; 216; 217; 218; 219; 220; 221; 222; 223; 224; 225; 226; 227; 228; 229; 230; 231; 232; 233; 234; 235; 236; 237; 238; 239; 240.

According to the invention, "one continuous metallic layer having a physical thickness of from 1 nm to 10 nm" includes the following values and/or any intervals comprised between these values: 1; 2; 3; 4; 5; 6; 7; 8; 9; 10.

According to the invention, "a LI layer having a physical thickness of from 50 nm to 110 nm" includes the following values and/or any intervals comprised between these values: 50; 51; 52; 53; 54; 55; 56; 57; 58; 59; 60; 61; 62; 63; 64; 65; 66; 67; 68; 69; 70; 71; 72; 73; 74; 75; 76; 77; 78; 79; 80; 81; 82; 83; 84; 85; 86; 87; 88; 89; 90; 91; 92; 93; 94; 95; 96; 97; 98; 99; 100; 101; 102; 103; 104; 105; 106; 107; 108; 109; 110.

According to another characteristic of the invention, the AR coating may comprise an antistatic layer (also named electrically conductive layer) such as described below. In general, this antistatic layer is positioned in the direction moving away from the substrate below and preferably directly below the "LI outer layer" (i.e.: the Li layer that is the farthest from the substrate).

According to the invention, the HI layer is a traditional high refractive index layer that is well known in the art. It generally comprises one or more metal oxides such as, without limitation, zirconia ($ZrO_2$), alumina ($Al_2O_3$), tantalum pentoxide ($Ta_2O_5$), praseodymium oxide ($Pr_2O_3$), praseodymium titanate ($PrTiO_3$), lanthanum oxide ($La_2O_3$), yttrium oxide ($Y_2O_3$), niobium oxide ($Nb_2O_5$), titanium dioxide ($TiO_2$) and mixtures thereof. The preferred materials include zirconia ($ZrO_2$), tantalum pentoxide ($Ta_2O_5$). According to a characteristic of the invention, the HI layer is zirconia ($ZrO_2$) (refractive index of 1.997). Optionally, the HI layers may further contain silica or other materials with a low refractive index, provided they have a refractive index higher than or equal to 1.55, preferably higher than or equal to 1.6 as indicated here above.

The LI layer is also well known and may comprise, without limitation, $MgF_2$, $SiO_2$, a mixture of silica and alumina, especially silica doped with alumina (the latter contributing to increase the antireflective coating thermal resistance), or a mixture thereof. The LI layer is preferably a layer comprising at least 80% by weight of silica, more preferably at least 90% by weight of silica, relative to the layer total weight, and even more preferably consists in a silica layer ($SiO_2$) (refractive index of 1.473). Optionally, the LI layers may further contain materials with a high refractive index or very high refractive index, provided the refractive index of the resulting layer is lower than to 1.55.

When a LI layer comprising a mixture of $SiO_2$ and $Al_2O_3$ is used, it preferably comprises from 1 to 10%, more preferably from 1 to 8% and even more preferably from 1 to 5% by weight of $Al_2O_3$ relative to the $SiO_2 + Al_2O_3$ total weight in such layer.

For example, $SiO_2$ doped with 4% $Al_2O_3$ by weight, or less, or $SiO_2$ doped with 8% $Al_2O_3$ may be employed. $SiO_2/Al_2O_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

As mentioned above, the ophthalmic lens of the invention may be made antistatic that is to say not to retain and/or develop a substantial static charge, by incorporating at least one electrically conductive layer into the stack present on the surface of the article.

The ability for a glass to evacuate a static charge obtained after rubbing with a piece of cloth or using any other procedure to generate a static charge (charge applied by corona . . . ) may be quantified by measuring the time it takes for said charge to dissipate. Thus, antistatic glasses have a discharge time of about a few hundred milliseconds, preferably 500 ms or less, whereas it is of about several tens of seconds for a static glass. In the present application, discharge times are measured according to the method exposed in the French application FR 2 943 798.

As used herein, an "electrically conductive layer" or an "antistatic layer" is intended to mean a layer which, due to its presence on the surface of a non-antistatic substrate (i.e. having a discharge time higher than 500 ms), enables to have a discharge time of 500 ms or less after a static charge has been applied onto the surface thereof.

The electrically conductive layer may be located on various places in the stack, generally in or in contact with the antireflective coating, provided the antireflective properties thereof are not affected. It is preferably located between two layers of the antireflective coating, and/or is adjacent to a layer with a high refractive index of such antireflective coating. Preferably, the electrically conductive layer is located immediately under a layer with a low refractive index of the antireflective coating, most preferably is the penultimate layer of the antireflective coating by being located immediately under the silica-based outer layer of the antireflective coating: e.g. the "LI outer layer".

The electrically conductive layer should be thin enough not to alter the transparency of the antireflective coating. The electrically conductive layer is preferably made from an electrically conductive and highly transparent material, generally an optionally doped metal oxide. In this case, the thickness thereof preferably varies from 1 to 15 nm, more preferably from 1 to 10 nm. Preferably, the electrically conductive layer comprises an optionally doped metal oxide, selected from indium, tin, zinc oxides and mixtures thereof. Tin-indium oxide ($In_2O_3$:Sn, tin-doped indium oxide), aluminum-doped zinc oxide (ZnO:Al), indium oxide ($In_2O_3$) and tin oxide ($SnO_2$) are preferred. In a most preferred embodiment, the electrically conductive and optically transparent layer is a tin-indium oxide layer, noted ITO layer or a tin oxide layer.

C°) Sub-Layer

In one embodiment of the present invention, the antireflective coating may be deposited onto a sub-layer. It should be noted that such sub-layer does not belong to the antireflective coating.

As used herein, a sub-layer or adhesion layer is intended to mean a relatively thick coating, used in order to improve the mechanical properties such as the abrasion resistance and/or the scratch resistance of said coating and/or so as to reinforce its adhesion to the substrate or to the underlying coating.

Because of its relatively high thickness, the sub-layer does not generally take part to the antireflective optical activity, especially when it has a refractive index close to that of the underlying substrate (which is generally the anti-abrasion and anti-scratch coating or the bare substrate).

The sub-layer should have a thickness that is sufficient for promoting the abrasion resistance of the antireflective coating, but preferably not to such an extent that a light absorption could be caused, which, depending on the sub-layer nature, could significantly reduce the relative transmission factor $\tau_v$. Its thickness is generally lower than 300 nm, more preferably lower than 200 nm, and is generally higher than 90 nm, more preferably higher than 100 nm.

The sub-layer preferably comprises a $SiO_2$-based layer, this layer comprising preferably at least 80% by weight of silica, more preferably at least 90% by weight of silica, relative to the layer total weight, and even more preferably consists in a silica layer. The thickness of such silica-based layer is generally lower than 300 nm, more preferably lower than 200 nm, and is generally higher than 90 nm, more preferably higher than 100 nm.

In a particular embodiment, the sub-layer consists in a $SiO_2$ layer.

According to an embodiment, the antireflective coating is not deposited onto a sub-layer such as described above.

D°) Process

The various layers of the antireflective coating and the optional sub-layer are preferably deposited by chemical vapor deposition, under vacuum, according to any of the following methods: i) by optionally ion-beam assisted, evaporation; ii) by ion-beam sputtering; iii) by cathode sputtering; iv) by plasma-assisted chemical vapor deposition. These various methods are described in the following references "Thin Film Processes" and "Thin Film Processes II," Vossen & Kern, Ed., Academic Press, 1978 and 1991, respectively. A particularly recommended method is the evaporation under vacuum.

Preferably, the deposition of each of the layers of the antireflective coating and of the optional sub-layer is conducted by evaporation under vacuum.

E°) Other Functional Layers

Generally, the front and/or rear main face of the substrate onto which an antireflective coating will be deposited is coated with an impact-resistant primer layer, with an anti-abrasion and/or anti-scratch coating, or with an impact-resistant primer layer coated with an anti-abrasion and/or anti-scratch coating.

The antireflective coating of the invention is preferably deposited onto an anti-abrasion and/or anti-scratch coating. The anti-abrasion and/or scratch-resistant coating may be any layer traditionally used as an anti-abrasion and/or anti-scratch coating in the field of ophthalmic lenses.

The anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2 702 486 (EP 0 614 957), U.S. Pat. Nos. 4,211,823 and 5,015,523.

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions are compositions based on polyurethanes and compositions based on latexes, especially polyurethane type latexes optionally containing polyester units.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5 μm.

The ophthalmic lens according to the invention may also comprise coatings formed on the antireflective coating and capable of modifying the surface properties thereof, such as hydrophobic and/or oleophobic coatings (antifouling top coat). These coatings are preferably deposited onto the outer layer of the antireflective coating. As a rule, their thickness is lower than or equal to 10 nm, does preferably range from 1 to 10 nm, more preferably from 1 to 5 nm.

Instead of the hydrophobic coating, a hydrophilic coating may be used which provides antifog properties, or an antifog precursor coating which provides antifog properties when associated with a surfactant. Examples of such antifog precursor coatings are described in the patent application WO 2011/080472.

Typically, an ophthalmic lens according to the invention comprises a substrate that is successively coated on its rear face with an impact-resistant primer layer, an anti-abrasion and scratch-resistant layer, an anti-UV, antireflective coating and with a hydrophobic and/or oleophobic coating, or with a hydrophilic coating which provides antifog properties, or an antifog precursor coating.

The front face of the substrate of the ophthalmic lens may be successively coated with an impact-resistant primer layer, an abrasion-resistant layer and/or a scratch-resistant layer, an antireflective coating according to the invention, and with a hydrophobic and/or oleophobic coating.

The optical article according to the invention is preferably an ophthalmic lens, such as spectacle lens, or a blank for spectacle lens. The lens may be a polarized lens, a photochromic lens or a solar lens, which may be tinted or not, be corrective, or not.

Hence, the present invention provides an antireflective coating with an improved conception, comprising a relatively thin stack made of layers, the thicknesses and materials of which have been selected so as to obtain satisfactory antireflective performances and a good compromise between very low reflection at the same times in the NIR region and in the visible region, while having robustness properties and good cosmetic appearance.

3. Optical Device

The present invention also relates to an optical device that will be described hereafter.

Especially, the optical device comprises a light source emitting at least in the deep red and near infrared region and the optical article such as defined above (i.e.: embodiment 1 or embodiment 2 with configuration(s) A and/or B).

Generally, the optical article is an ophthalmic lens and comprises all the characteristics described above, in combination or not, for the optical article according to the invention. In general, this optical article is or is incorporated in an eye tracking device, an augmented reality device or a virtual reality device.

For instance, the optical device may correspond to the one described in the patent application PCT/EP2019/074697.

In particular, the optical device according to the invention may comprise the ophthalmic lens (such as describes above) and a light source emitting in the deep red and near infrared region, that is to say at wavelengths ranging from 700 nm to 2500 nm.

The light source can for instance be a light-emitting diode (LED).

In order to detect light emitted from that source, it is possible to use a video camera sensitive to NIR wavelengths, for instance a camera of the CCD (Charge-Coupled Device) type or of the CMOS (Complementary Metal Oxide Semiconductor) type, without any deep red and NIR filter. As a variant, instead of a camera, an array of single deep red and NIR sensors or a PSD (Position Sensitive Detector) sensor or any other appropriate sensor can be used.

Figure 2:
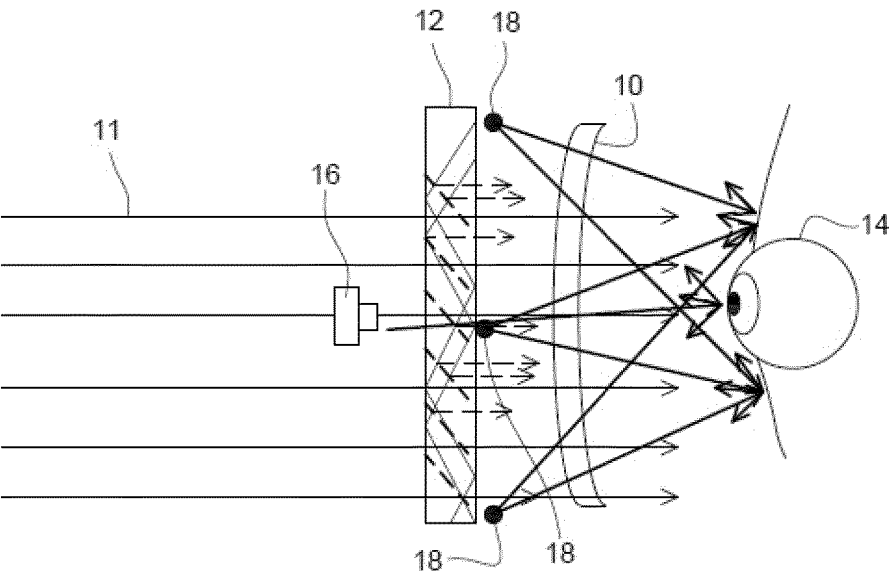
FIG. 2 is a schematic view of eye tracking device according to the present invention according to a first embodiment.

For instance, FIG. 2 shows a non-limiting example of an arrangement in an augmented reality device or virtual reality device comprising an optical device according to the invention.

The optical device comprises the ophthalmic lens 10 placed between, on one hand, the eye 14 of a user and on the other hand, a light optical element 12. The light optical element 12 can be for instance a waveguide having coupling means for coupling light into, and outcoupling means for outcoupling light towards the eye 14 of the user, so that the user can perceive a virtual image.

The horizontal arrows 11 going through the light optical element 12 and through the ophthalmic lens 10 represent light coming from the environment.

A deep red and NIR eye tracker is also included in the augmented reality device or virtual reality device. The deep red and NIR eye tracker comprises a deep red and NIR camera 16 and at least one deep red and NIR light source 18, which source 18 is comprised in the optical device according to the invention.

In the embodiment shown in FIG. 2, the sources 18 are placed between the light optical element 12 and the ophthalmic lens 10, while the camera 16 is placed in front of the light optical element 12.

As a variant, the camera 16 and the sources 18 could be placed in front of the light optical element 12.

As another variant, the light optical element 12 could be used both for providing a virtual image and for providing light illumination. Light reflected by the eye 14 can then come back to the light optical element 12 and be redirected to a deep red and NIR light sensor.

The ophthalmic lens 10 can provide an optical function to the user. It can for instance be a corrective lens, namely, a power lens of the spherical, cylindrical and/or addition type for an ametropic user, for treating myopia, hypermetropia, astigmatism and/or presbyopia.

The lens 10 can have a constant power, so that it provides power as a single vision lens would do, or it can be a progressive lens having variable power.

It also comprises, on its rear main face and/or on its front main face, preferably both on its rear main face and its front main face, the above-mentioned AR coating having at least a very low reflectance both in the visible region and in the part of the NIR region used in ET systems (800 to 900 nm).

Indeed, according to the configuration A described above, the ophthalmic lens 10 comprises on its rear main face and its front main face, an AR coating satisfying the following characteristics: a $R_v$ that is lower than or equal to 2.5% for at least an angle of incidence lower than or equal to 35°, a $R_m^{ET}{}_{(800-900)}$ that is lower than or equal to 1.5% at an angle of incidence lower than or equal to 20° and a $R_m^{NIR}$ that is higher than or equal to 11.5%, preferably higher than or equal to 12% at an angle of incidence lower than or equal to 20°.

Alternatively, according to the configuration B described above, the ophthalmic lens comprises one absorbing dye which absorbs in the near infrared region ranging from 900-2000 nm and on its rear main face and its front main face, an AR coating satisfying at least the following characteristics: a $R_v$ that is lower than or equal to 2.5%, preferably lower than or equal to 0.65% for at least an angle of incidence lower than or equal to 35°, and a $R_m^{ET}{}_{(800-900)}$ that is lower than or equal to 1.5% preferably lower than or equal to 0.65% at an angle of incidence lower than or equal to 20°. Hence, according to this configuration, the high reflection in the NIR region ranging from 900-2000 nm is due to the presence of the dye into the transparent substrate.

Alternatively, it is also possible to combine configuration A (NIR rejection obtained from the AR coatings) with configuration B (incorporation into the substrate of the absorbing dye that absorbs between 900-2000 nm) so as to increase the level of NIR protection ranging from 900 to 2000 nm.

Whatever the configurations, the different configurations of the ophthalmic lenses according to the invention enable to limit the power consumption that is useful for ET illumination systems (thanks to a high transmission in the part of the NIR used for ET systems, i.e.: high $T_m^{ET}{}_{(800-900)}$), while also limiting ghost images in this part of the NIR (low $R_m^{ET}{}_{(800-900)}$) and at the same time suppressing or reducing NIR light (900-1500 nm or 900-2000 nm) coming from the outside environment of the user/wearer that would be harmful to his/her eyes.

The following examples illustrate the present invention in a more detailed, but non-limiting manner.

4. EXAMPLES

A°) General Procedures

The optical articles used in the examples comprise a lens substrate, having a 65 mm diameter, a refractive index of 1.60 (MR-8® lens from MITSUI) and a power of −2.00 diopters and a center thickness of 1.2 mm, coated on its front face with 3 μm thick hard coat having a refractive index of 1.5 (i.e.: Mithril 1.5).

The layers of the antireflective coating according to the invention were deposited onto both the front face and the rear face of the tested lenses without heating the substrates by evaporation under vacuum (evaporation source: electron gun).

The deposition frame is a Leybold 1104 machine fitted with an electron gun (ESV14 (8 kV)) for evaporating oxides and metal, and provided with an ion gun (Commonwealth Mark II) for the preliminary phase to prepare the surface of the substrate using argon ions (IPC) and to evaporate the metal layer (Au) with ions assisted deposition (IAD).

Especially, the deposition step of the $Ta_2O_5$, $ZrO_2$ and $SiO_2$ are classical and well known by the person skilled in the art.

The thickness of the layers was controlled by means of a quartz microbalance. The spectral measurements were effected on a variable incidence-spectrophotometer Perkin-Elmer Lambda 850 with an URA accessory (Universal Reflectance Accessory).

B°) Test Procedure

The method for making optical articles/lenses comprises the step of introducing the substrate, coated with the anti-abrasion and scratch-resistant coating, into a vacuum deposition chamber, a step of pumping until a high-vacuum is obtained, a step of activating the front face of the substrate by means of an argon ion beam (anode current: 1 A, anode voltage: 100 V, neutralization current: 130 mA), turning the ion irradiation off, forming the various layers of the antireflective coating by successive evaporations on the rear face and last a ventilation step.

Configuration A

In particular, the transparent substrate of lenses 1 to 6 does not comprise any absorbing dye (blank lenses with no dye inside).

Configuration B

In addition, for lenses 10 to 15, a dye S2007 is added into the substrate according to the method described in the document EP 3 327 488. Indeed, S2007 cyanine dye have shown very good solubility in the epoxy coating mentioned in EP 3327488A1 and also in the Mithril 1.5 hard coat and MR 8 substrate.

The substrate of lenses 10, 12 and 14 comprises 3 ppm of the dye and the substrate of lenses 11, 13 and 15 comprising 5 ppm of the dye.

C°) Results

The structural characteristics and the optical performances of the ophthalmic lenses 1 to 15 obtained in the Examples 1 to 15 according to the invention are detailed hereunder.

Figure 3:
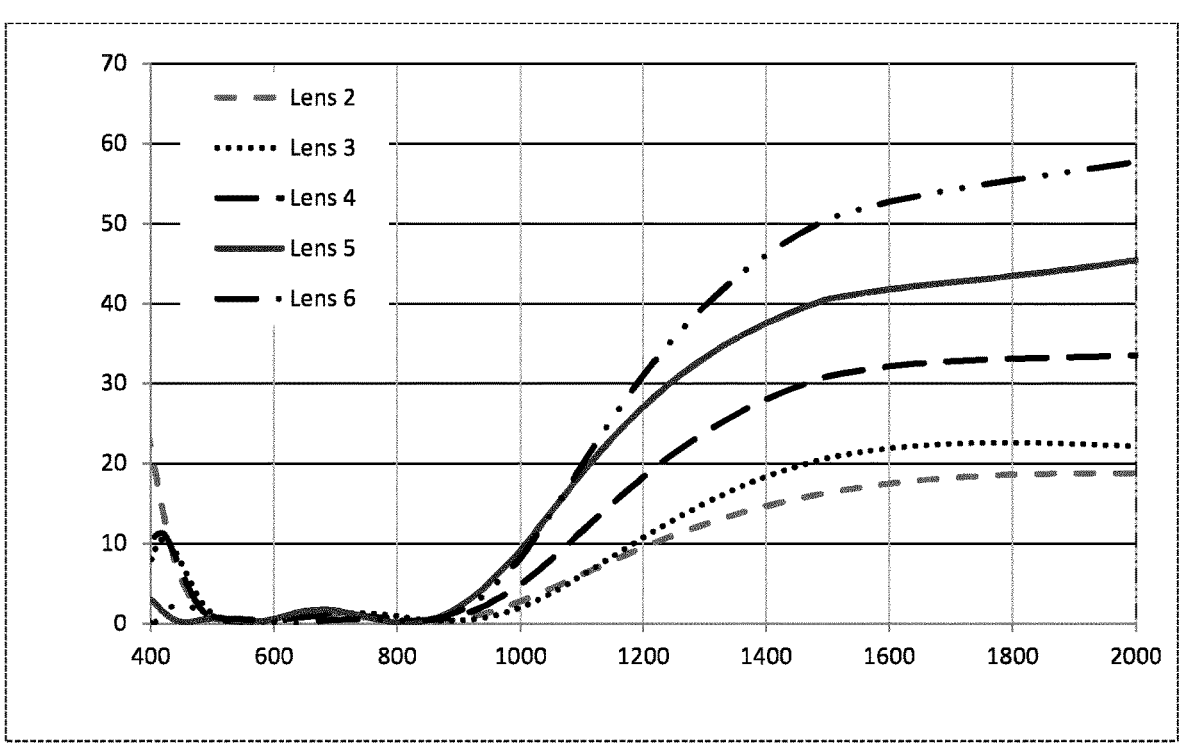
FIG. 3 shows the variation of the refection (R, %) on the front surface of lenses 2 to 6 according to the invention prepared in the examples 2 to 6, respectively, at an angle of incidence of 15° as function of the wavelength in the visible region (400-780 nm) and in approximately the NIR region (780-2000 nm)
Figure 4:
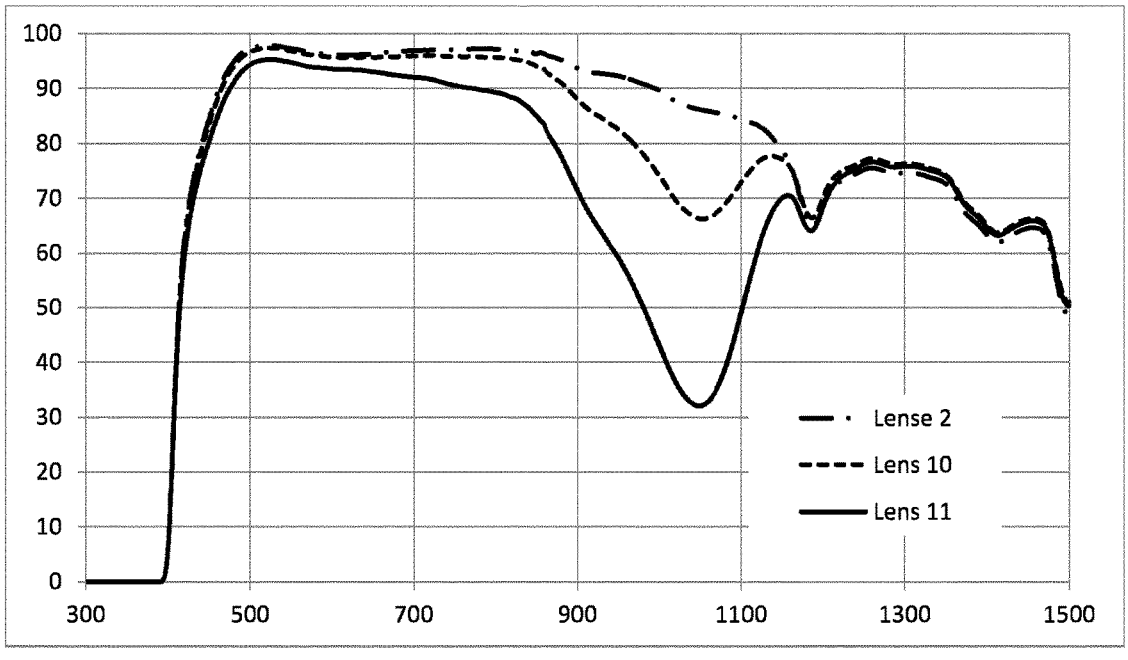
FIG. 4 shows the variation of the transmission (T, %) of lenses 2, 10 and 11 according to the invention prepared in the examples 2, 10 to 11, respectively, at an angle of incidence of 15° as function of the wavelength in the visible region (380-780 nm) and in approximately the NIR region (780-1500 nm)
Figure 5:
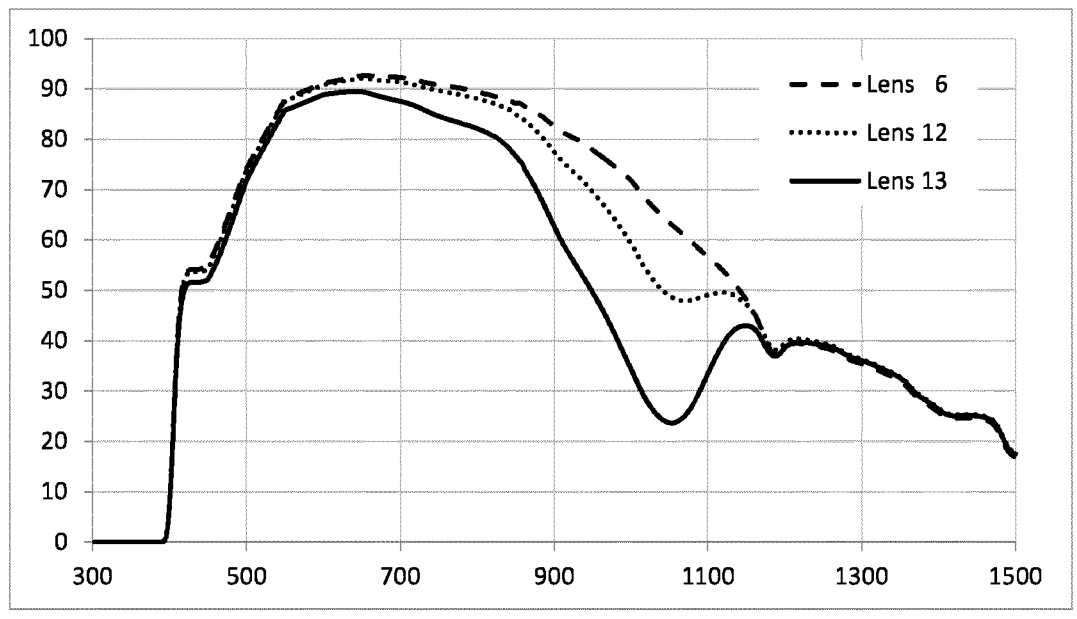
FIG. 5 shows the variation of the transmission (T, %) of lenses 6, 12 and 13 according to the invention prepared in the examples 2, 12 and 13, respectively, at an angle of incidence of 15° as function of the wavelength in the visible region (380-780 nm) and in approximately the NIR region (780-1500 nm).

The reflection graphs between 400 to 2000 nm of these lenses 2 to 6 are illustrated on FIG. 3 with angle of incidence of 15°, and the transmission graphs between 300 to 1500 nm for lenses 10 to 13 (global lenses) are illustrated on FIG. 4 and FIG. 5 with angle of incidence of 15.

The optical values are those of the front face. Factors Rv (%), $T_v$(%), $R_m^{ET}$(800-900), $T_m^{ET}$(800-900), $R_m^{NIR}$, $Tm_{(900-1500)}$ of reflected light are provided for an angle of incidence of 0° a standard illuminant D65 and a standard observer (angle 10°).

Structures

The tested lenses 1 to 9 according to the invention comprise on its rear and front main faces the AR coating illustrated in examples 1 to 9 (same example on both side)

and have the following structure (in nm—physical thickness) in the direction moving from the substrate ("Sub." means substrate):

TABLE 1

| Example 1 | |
| --- | --- |
| Material | Thickness (nm) |
| $SiO_2$ | 106.6 |
| $ZrO_2$ | 161.5 |
| $SiO_2$ | 30.6 |
| $ZrO_2$ | 14.4 |
| Sub. + Varnish 1.5 | |

TABLE 3

| Material | Ex. 3 | Ex. 4 | Ex. 5 | Ex. 6 | Ex. 7 | Ex. 8 | Ex. 9 |
| --- | --- | --- | --- | --- | --- | --- | --- |
| | | | | Thickness (nm) | | | |
| $SiO_2$ | 91.8 | 88.7 | 68.6 | 62.4 | 81.7 | 74.9 | 73.2 |
| $Ta_2O_5$ | — | — | 16.9 | 24.2 | 18.5 | 15.0 | 21.4 |
| Au | 2.2 | 3.8 | 5.6 | 7.1 | 5.1 | 5.7 | 5.9 |
| $Ta_2O_5$ | 193.1 | 194.5 | 191.4 | 216.6 | 186.3 | 219.6 | 224.6 |
| $SiO_2$ | 38.7 | 30.4 | 20.6 | 35.6 | 32.5 | 29.1 | 34.5 |
| $Ta_2O_5$ | 18.1 | 22.2 | 18.4 | 18.0 | 20.8 | 18.3 | 18.1 |
| Sub. + Varnish 1.5 | | | | | | | |

TABLE 2

| Example 2 | |
| --- | --- |
| Material | Thickness (nm) |
| $SiO_2$ | 110.6 |
| $Ta_2O_5$ | 69.3 |
| $SiO_2$ | 4.8 |
| $Ta_2O_5$ | 76.4 |
| $SiO_2$ | 40.1 |
| $Ta_2O_5$ | 13.6 |
| Sub. + Varnish 1.5 | |

The tested lenses 10 to 15 according to the invention comprise on its rear and front main faces the AR coating illustrated in examples 10 to 13 (same example on both side), respectively and have the following structure (in nm—physical thickness) in the direction moving from the substrate:

lenses 10 and 11 have the same structure as lens 2, but the substrate MR8 comprises 3 or 5 ppm, respectively;

lenses 12 and 13 have the same structure as lens 6, but the substrate MR8 comprises 3 or 5 ppm, respectively and lenses 14 and 15 have the same structure as lens 1, but the substrate MR8 comprises 3 or 5 ppm, respectively.

Optical Characteristics (FIG. 3 to 5)

Configuration A: Lenses 1 to 9

TABLE 4

| Lens | Rv (%) | Tv (%) | $R_m^{ET}$(800-900) (%) | $R_m^{ET}$(800-950) (%) | $R_m^{ET}$(800-1000) (%) | $T_m^{ET}$(800-900) (%) | $R_m^{NIR}$(900-2000) (%) | $R_m^{NIR}$(950-1500) (%) | $R_m^{NIR}$(950-1000) (%) |
| --- | --- | --- | --- | --- | --- | --- | --- | --- | --- |
| Lens 1 | 0.65 | 96.5 | 0.30 | ND | ND | 95.9 | 11.8 | ND | ND |
| Lens 2 | 0.50 | 96.7 | 0.20 | ND | ND | 96.1 | 13.2 | ND | ND |

TABLE 4-continued

| Lens | Rv (%) | Tv (%) | $R_m^{ET}$(800-900) (%) | $R_m^{ET}$(800-950) (%) | $R_m^{ET}$(800-1000) (%) | $T_m^{ET}$(800-900) (%) | $R_m^{NIR}$(900-2000) (%) | $R_m^{NIR}$(950-1500) (%) | $R_m^{NIR}$(950-1000) (%) |
|---|---|---|---|---|---|---|---|---|---|
| Lens 3 | 0.50 | 92.6 | 0.50 | ND | ND | 93.5 | 15.7 | ND | ND |
| Lens 4 | 0.53 | 90.5 | 0.54 | ND | ND | 90.6 | 24.2 | ND | ND |
| Lens 5 | 0.47 | 87.9 | 0.60 | ND | ND | 88.3 | 32.9 | ND | ND |
| Lens 6 | 0.52 | 85.2 | 0.63 | ND | ND | 86.8 | 40.3 | ND | ND |
| Lens 7 | 0.5 | 89.4 | 0.33 | 0.8 | ND | 92.5 | 26.9 | 20 | ND |
| Lens 8 | 0.5 | 88.0 | 0.58 | 0.8 | ND | 91.9 | 34.1 | 25 | ND |
| Lens 9 | 0.75 | 87.1 | 0.31 | ND | 0.8 | 92.5 | 33.0 | ND | 25 |

ND: not determined

Hence, as shown on Table 4, the lenses 1 to 9 according to the invention, enable to obtain both low reflectance in the visible region and in the part of the NIR range used in ET systems (ie.: 800-900 nm and/or 800-950 nm and/or 800-1000 nm), while being at the same time able to have or to impart to the optical article a high reflection in the NIR region (i.e. 900-2000 nm and/or 950 to 1500 nm and/or 950-1000 nm) that is potentially harmful to the eyes of the wearer. In addition, the transmission in the part of the NIR range used in ET systems (ie.: 800-900 nm) is optimized.

Configuration B: Lenses 10 to 15 (with Dye)

Lens 2—no metal layer (no dye), Lens 7 (dye 3 ppm) and Lens 8 (dye 5 ppm)

TABLE 5

| | Tv (%) | $T_m^{ET}$(800-900) | $T_{m}$(900-1500) |
|---|---|---|---|
| Lens 2 | 96.7 | 96.1 | 76.7 |
| Lens 10 | 96.2 | 93.2 | 72.5 |
| Lens 11 | 94.0 | 83.2 | 61.4 |

Lens 6 with a metal layer (no dye), Lens 12 (dye 3 ppm) and Lens 13 (dye 5 ppm)

TABLE 6

| | Tv (%) | $T_m^{ET}$(800-900) | $T_{m}$(900-1500) | $R_m^{NIR}$(900-2000) (%) |
|---|---|---|---|---|
| Lens 6 | 85.2 | 86.8 | 46.8 | 40.3 |
| Lens 12 | 84.8 | 84.2 | 42.3 | ND |
| Lens 13 | 82.9 | 75.1 | 34.9 | ND |

Lens 1—no metal layer (no dye), Lens 11 (dye 3 ppm) and Lens 12 (dye 5 ppm)

TABLE 7

| | Tv (%) | $T_m^{ET}$(800-900) | $T_{m}$(900-1500) |
|---|---|---|---|
| Lens 1 | 96.4 | 95.9 | 78.3 |
| Lens 14 | 95.7 | 93.1 | 74.1 |
| Lens 15 | 93.8 | 83.1 | 62.9 |

These tables 5 and 7 show that the transmission in the part of the NIR wavelengths used for the ET system is high for limiting the power consumption used for ET illumination system, whereas the transmission in the NIR ranging from 900 to 1500 nm (corresponding to the outside environment of the wearer of the ET system) is relatively low, especially when a dye is used. Indeed, the presence of the dye into the substrate of lenses 10 to 15 enables in particular to lower the value of $Tm_{(900-1500)}$ as compared to the value without dye (lenses 2, 6 and 1).

This characteristic enables to protect the eyes of the wearer from this NIR light.

The invention claimed is:

1. An optical article comprising a transparent substrate with a front main face and with a rear main face, at least one of the main faces being coated with a multilayered interferential coating comprising a stack of at least two high refractive index layer (HI) having a refractive index higher than or equal to 1.55 and at least two low refractive index layer (LI) having a refractive index layer lower than 1.55, wherein said multilayered interferential coating has:

a mean light reflection factor in the visible region, noted $R_v$, that is lower than or equal to 2.5% for at least an angle of incidence lower than or equal to 35°;

a mean reflection factor for wavelengths ranging from 800 nm to 900 nm, noted $R_m^{ET}$(800-900), that is lower than or equal to 1.5% at an angle of incidence lower than or equal to 20°;

a mean reflection factor in the near infrared (NIR) region ranging from 900 nm to 2000 nm, noted $R_m^{MIR}$, that is higher than or equal to 11.5% at an angle of incidence lower than or equal to 20° and/or said transparent substrate comprises at least one absorbing dye which absorbs in the near infrared region at a wavelength ranging from 900 to 2000 nm;

an average transmission factor for wavelengths ranging from 800 nm to 900 nm, noted $Tm^{ET}$(800-900), that is higher than or equal to 60% at an angle of incidence lower than or equal to 20°; and an average transmission factor for wavelengths ranging from 900 nm to 1500 nm, noted $Tm_{(900-1500)}$, that is lower than or equal to 80% at an angle of incidence lower than or equal to 20°.

2. The optical article of claim 1, wherein said multilayered interferential coating has a mean reflection factor in the near infrared $R_m^{NIR}$ that is higher than or equal to 12% at an angle of incidence lower than or equal to 20°.

3. The optical article of claim 2, wherein said multilayered interferential coating has a mean reflection factor in the near infrared $R_m^{NIR}$ that is higher than or equal to 15% at an angle of incidence lower than or equal to 20°.

4. The optical article of claim 3, wherein said multilayered interferential coating has a mean reflection factor in the near infrared $R_m^{NIR}$ that is higher than or equal to 30% at an angle of incidence lower than or equal to 20°.

5. The optical article of claim 1, wherein said multilayered interferential coating has a mean reflection factor $R_m^{ET}$(800-900) that is lower than or equal to 1% at an angle of incidence lower than or equal to 20°.

6. The optical article according claim 1, wherein said multilayered interferential coating has a mean reflection factor $R_m^{ET}$(800-950) and/or a mean reflection factor $R_m^{ET}$(800-1000) that is lower than or equal to 1% at an angle of incidence lower than or equal to 20°.

7. The optical article of claim 1, wherein said optical article has an average transmission factor for wavelengths ranging from 800 nm to 900 nm, noted $T_m^{ET}{}_{(800\text{-}900)}$, that is higher than or equal to 70% at an angle of incidence lower than or equal to 20°.

8. The optical article of claim 1, wherein said at least one absorbing dye is able to transmit at least 50% of the light having a wavelength ranging from 800 to 900 nm arriving at least on one of the main faces of the substrate and blocks at least 30% of the light having a wavelength ranging from 1000 to 1500 nm arriving at least on one of the main faces of the substrate.

9. The optical article of claim 8, wherein said at least one absorbing dye is able to transmit at least 60% of the light having a wavelength ranging from 800 to 900 nm and blocks at least 40% of the light having a wavelength ranging from 1000 to 1500 nm arriving at least on one of the main faces of the substrate.

10. The optical article of claim 8, wherein said at least one absorbing dye is able to transmit at least 50% of the light having a wavelength ranging from 700 to 1000 nm arriving at least on one of the main faces of the substrate and blocks at least 40% of the light having a wavelength ranging from 1000 to 1500 nm arriving at least on one of the main faces of the substrate.

11. The optical article of claim 1, wherein said multilayered interferential coating comprises alternately HI layers and LI layers and has a number of layers higher than or equal to 4.

12. The optical article of claim 11, wherein the multilayered interferential coating comprises at least, in the direction moving away from said substrate:

one HI layer having a physical thickness of from 8 nm to 25 nm;

one LI layer having a physical thickness of from 15 nm to 50 nm;

one HI layer having a physical thickness of from 110 nm to 200 nm; and one LI layer having a physical thickness of from 80 nm to 130 nm.

13. The optical article of claim 11, wherein the multilayered interferential coating comprises at least, in the direction moving away from said substrate:

one HI layer having a physical thickness of from 8 nm to 25 nm;

one LI layer having a physical thickness of from 20 nm to 60 nm;

one HI layer having a physical thickness of from 50 nm to 95 nm;

one LI layer having a physical thickness of from 1 nm to 15 nm;

one HI layer having a physical thickness of from 50 nm to 90 nm; and one LI layer having a physical thickness of from 80 nm to 130 nm.

14. The optical article of claim 11, wherein said multilayered interferential coating further comprises at least one continuous metallic layer made of at least one or more metals selected from Silver (Ag), Aluminum (Al), Gold (Au), Barium (Ba), Boron (B), Cadmium (Cd), Cerium (Ce), Cobalt (Co), Chromium (Cr), Copper (Cu), Iron (Fe), Germanium (Ge), Hafnium (Hf), Indium (In), Iridium (Ir), Potassium (K), Lanthanum (La), Magnesium (Mg), Manganese (Mn), Molybdenum (Mo), Nickel (Ni), Neodymium (Nd), Niobium (Nb), Lead (Pb), Palladium (Pd), Platinum (Pt), Rhenium (Re), Antimony (Sb), Selenium (Se), Silicon (Si), Tin (Sn), Strontium (Sr), Tantalum (Ta), Titanium (Ti), Tellurium (Te), Thallium (Tl), Vanadium (V), Tungsten (N), Zinc (Zn) or Zirconium (Zr), or combination thereof.

15. The optical article of claim 14, wherein said multilayered interferential coating comprises at least, in the direction moving away from said substrate:

one HI layer having a physical thickness of from 8 nm to 40 nm;

one LI layer having a physical thickness of from 8 nm to 60 nm;

one HI layer having a physical thickness of from 170 nm to 240 nm;

the at least one continuous metallic layer having a physical thickness of from 1 nm to 10 nm; and one LI layer having a physical thickness of from 50 nm to 110 nm.

16. The optical article of claim 1, wherein the two main faces of said optical article are coated with said multilayered interferential coating.

17. An optical device comprising a light source emitting in the deep red and near infrared region, wherein it comprises the optical article as defined in claim 16.

18. The optical device of claim 17, wherein it is an augmented reality device, a virtual reality device, or an eye tracking device.

19. The optical article of claim 14, wherein said multilayered interferential coating comprises at least, in the direction moving away from said substrate:

one HI layer having a physical thickness of from 8 nm to 40 nm;

one LI layer having a physical thickness of from 8 nm to 60 nm;

one HI layer having a physical thickness of from 170 nm to 240 nm;

the at least one continuous metallic layer having a physical thickness of from 1 nm to 10 nm;

one HI layer having a physical thickness of from 8 nm to 40 nm; and one LI layer having a physical thickness of from 50 nm to 110 nm.

* * * * *